United States Patent [19]

Smith

[11] Patent Number: 4,665,521
[45] Date of Patent: May 12, 1987

[54] PORTABLE TESTING DEVICE FOR MONITORING COMMUNICATION LINE ACTIVITY

[75] Inventor: Robert K. Smith, Miamisburg, Ohio
[73] Assignee: NCR Corporation, Dayton, Ohio
[21] Appl. No.: 694,716
[22] Filed: Jan. 25, 1985
[51] Int. Cl.⁴ ............................................. G06F 11/00
[52] U.S. Cl. ........................................ 371/22; 371/15
[58] Field of Search ............... 371/22, 15; 364/200, 364/900; 324/73 AT, 66, 73 R; 179/175.3 R; 370/15; 375/10

[56] References Cited

U.S. PATENT DOCUMENTS

| | | | |
|---|---|---|---|
| 3,941,950 | 3/1976 | Dunwoodie | 179/175.3 R |
| 3,986,106 | 10/1976 | Shuck | 324/66 |
| 4,034,195 | 7/1977 | Bates | 371/22 |
| 4,057,847 | 11/1977 | Lowell | 364/200 |
| 4,271,514 | 6/1981 | Parras | 371/22 |
| 4,308,615 | 12/1981 | Koegel | 364/900 |
| 4,357,574 | 11/1982 | Takamisawa | 324/73 R |
| 4,399,400 | 8/1983 | Rockwell | 324/73 AT |

OTHER PUBLICATIONS

Advertising sheet for: RS-232 Data Line Testers-/Adapters by L-COM Data Products, Nov. 1984.

Primary Examiner—Michael R. Fleming
Attorney, Agent, or Firm—Wilbert Hawk, Jr.; Albert L. Sessler, Jr.; Elmer Wargo

[57] ABSTRACT

This invention relates to a portable testing device which is used in a system having a host terminal, a plurality of secondary terminals, and a communication line interconnecting the host and secondary terminals for in-house communication. The transmission line includes a transmit line pair, a receive line pair, and a ground line. The testing device is operated in one of three modes which are selected via a switch on the device. The three modes of operation are:

(1) Monitoring the transmit lines from the host and secondary terminals;
(2) Performing "turn-around" functions with the host or secondary terminals; and
(3) Performing "turn-around and load testing" with the host or secondary terminals.

5 Claims, 7 Drawing Figures

PORTABLE TESTING DEVICE FOR MONITORING COMMUNICATION LINE ACTIVITY

BACKGROUND OF THE INVENTION

This invention relates to a portable testing device for use in monitoring the communication line activity in a system including a host terminal and a plurality of secondary terminals and for performing turn-around functions with regard to selected terminals in the system.

When installing systems including a host terminal and a plurality of secondary terminals which are all interconnected by a communication line, it is necessary to monitor the transmitting by the host terminal and the secondary terminals in order to install the system properly. It is also necessary to single out the host terminal or the individual secondary terminals to monitor or check the selected terminal for turn-around functions. These monitoring activities are also performed on installed systems when maintenance and repairs are necessary. In such systems, a small, portable device would be extremely useful in performing the monitoring activities mentioned.

SUMMARY OF THE INVENTION

A preferred embodiment of the testing device of this invention may be used in a system having a host terminal, a plurality of secondary terminals, and a communication line interconnecting said host and secondary terminals, said communication line having a transmit line pair, a receive line pair, a reference line, and a plurality of first couplers positioned along the length of said communication line; said host terminal and each said secondary terminals having a second coupler associated therewith for coupling to said communication line via said first couplers. The testing device is used for monitoring transmission of data by said host and secondary terminals, for performing turn-around testing of said host and secondary terminals, and for performing turn-around and load testing of said host and secondary terminals. The portable testing device comprises: a frame; a said first coupler, a said second coupler, first and second visual indicators, and a switch, all mounted on said frame; said switch having first, second and third selectable positions; first circuit means for coupling said second coupler on said device and said first and second indicators when said second coupler of said device is coupled to one of said first couplers on said communication line and when said switch is in said first position to enable said first indicator to become active when said host terminal is transmitting over said transmit line pair and also to enable said second indicator to become active when at least one of said secondary terminals is transmitting over said receive line pair; second circuit means for coupling said first coupler on said device with the second coupler from said host terminal or one of said secondary terminals to perform said turn-around testing of the associated said host terminal or the associated said secondary terminal when said switch is in said second position; and third circuit means for coupling said first coupler on said device with said second coupler from said host terminal or one of said secondary terminals to perform said turn-around and load testing of the associated said host terminal or the associated said secondary terminal when said switch is in said third position.

The testing device of this invention is inexpensive to produce, compact and performs more than one function. These advantages and others will become more readily understood in connection with the following description, claims and drawing.

BRIEF DESCRIPTION OF THE DRAWING

FIG. 5-1 shows the equivalent circuit, in schematic form, of the testing device shown in FIG. 4 when the associated switch thereon is in a first of three selectable positions;

FIG. 5-2 shows the equivalent circuit, in schematic form, of the testing device shown in FIG. 4 when the associated switch is in a second of three selectable positions; and FIG. 5-3 shows the equivalent circuit, in schematic form, of the testing device shown in FIG. 4 when the associated switch thereon is in the third of three selectable positions.

DETAILED DESCRIPTION OF THE INVENTION

Figure 1:
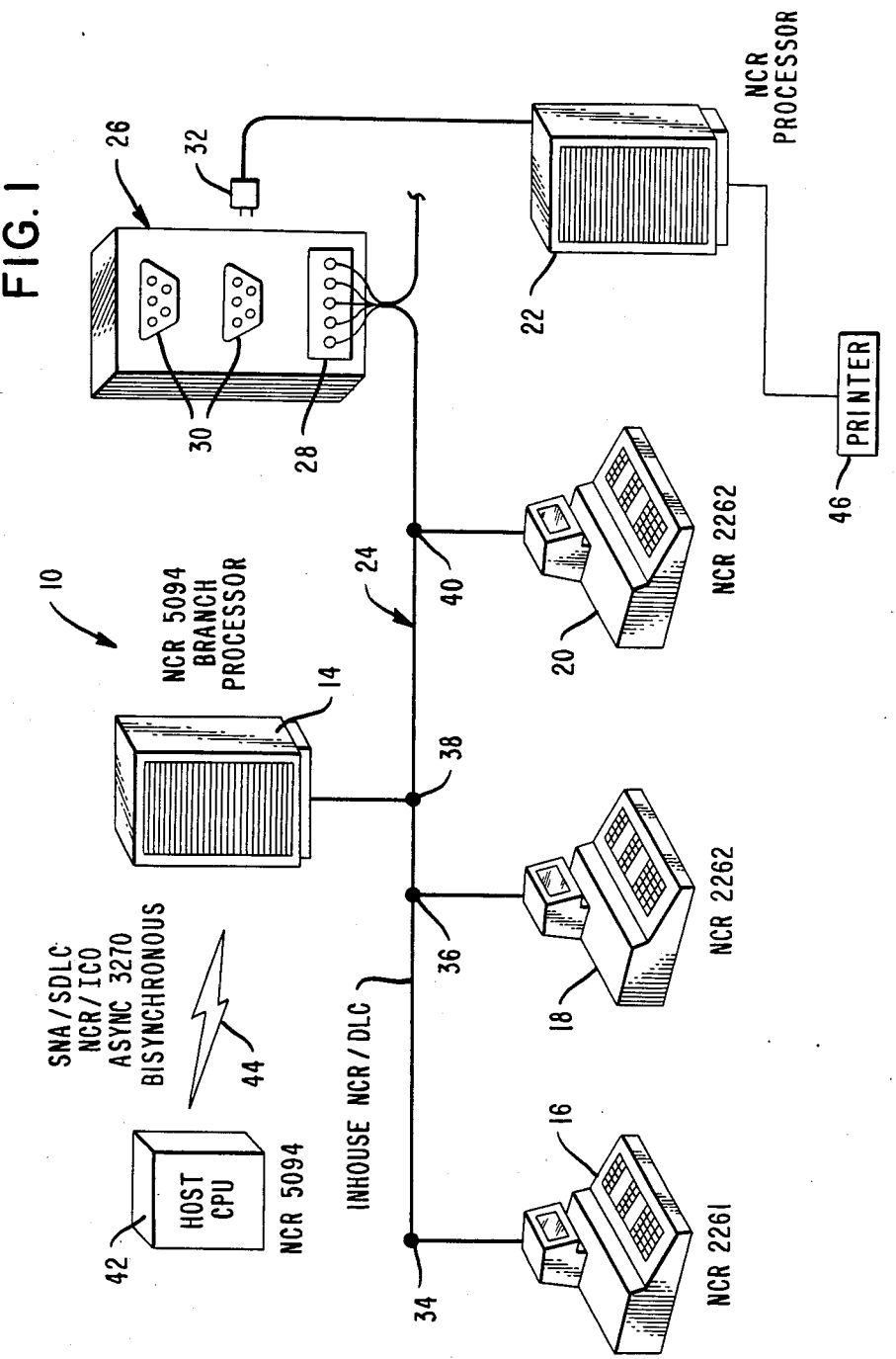
FIG. 1 is a general pictorial diagram showing a portion of a system in which the portable testing device of this invention may be used.

FIG. 1 is a general pictorial diagram, in perspective, of a system 10 in which the portable testing device 12 (FIGS. 2, 3) of this invention may be used. The system 10 includes a host terminal or branch processor 14 and a plurality of secondary terminals 16, 18, 20 and 22, for example, which are coupled together by a communication line 24. In the embodiment described, the system 10 may be an NCR 5000 system, for example, which is also called a Branch Automated System or BAS and is available from the NCR Corporation of Dayton, Ohio. It will be recognized that the invention is not limited to a system utilizing NCR processors and terminals, and is adaptable for use with apparatus of other manufacturers. Only a portion of the NCR 5000 system is shown in FIG. 1 to simplify the drawing. The types of some of the terminals used in the system 10 are shown in FIG. 1.

The communication line 24 (FIG. 1) is referred to as NCR/DLC which is an "in-house" communication system used by NCR Corporation, with DLC standing for Data Link Communication. As far as this invention is concerned, it is sufficient to state that the communication line 24 includes a pair of transmitting lines, a pair of receiving lines, and a shielding or ground conductor. The communication line 24 may be up to 9000 feet in length in some installations, and the line 24 is provided with a plurality of junction boxes, like 26, along the length thereof to enable the branch processor 14 and the various secondary terminals, like 16 and 18, to be coupled together as shown. The junction box 26 is shown pictorially in FIG. 1, and it has a terminal strip 28 for providing parallel connections for various lengths of the communication line 24. The box 26 (shown in greatly enlarged size in FIG. 1) also includes female or first couplers 30 which are connected in parallel to the terminal strip 28. Each terminal, like 22, has a male or second coupler 32 by which it is coupled to the communication line 24 by inserting the second coupler 32 into one of the first couplers 30. A junction box 26 is positioned at each one of the nodes 34, 36, 38 and 40 shown in FIG. 1. In the system 10, the branch processor 14 may be coupled to a host central processing unit (CPU) 42 via any of the conventional communication links such as SNA/SDLC, NCR/ISO, ASYNC 3270 or BISYNCHRONOUS, which links are shown collectively as 44. Each of the terminals 16, 18, 20 and 22 may have additional units coupled to it in the system 10 as shown by printer 46 being coupled to terminal 22 (which may be a processor); however, because this aspect is not important to an understanding of this invention, no additional showing in FIG. 1 is deemed necessary.

Figure 2:
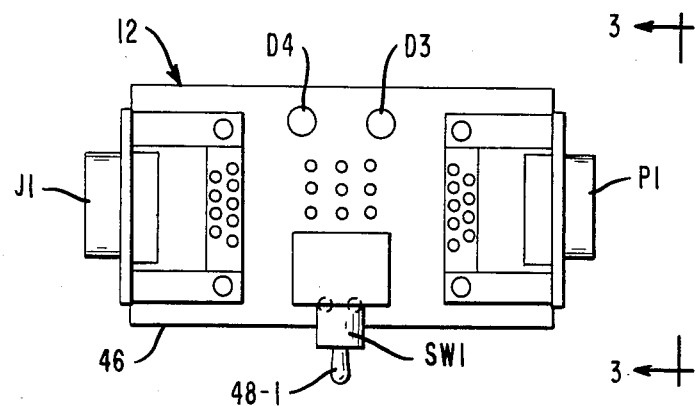
FIG. 2 is a plan view of the portable testing device of this invention.
Figure 3:
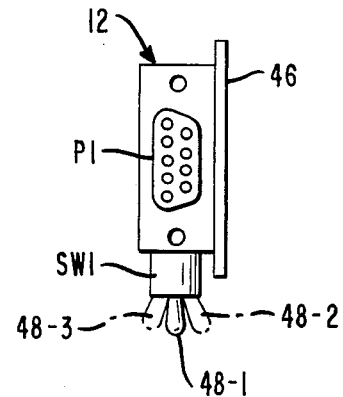
FIG. 3 is an end view of the testing device and is taken from the line 3—3 of FIG. 2.

FIGS. 2 and 3 show the approximate actual size of a preferred embodiment of the testing device 12 made according to this invention. The device 12 includes a frame or substrate 46 on which a female or first coupler J1 is mounted. Coupler J1 is identical to the first coupler 30 which appears on the junction box 26.

The device 12 also includes a male or second coupler P1 which is mounted on the substrate 46 as shown in FIG. 2. The device 12 also includes a switch SW1, a first visual indicator such as a green light-emitting diode (LED) D3, and a second visual indicator such as an LED which is designated as D4. The electrical connections for the various components shown in FIGS. 2 and 3 will be described hereinafter in relation to FIGS. 4, 5-1, 5-2 and 5-3. The switch SW1 is manually settable into one of three positions; namely, first, second and third positions.

When the toggle lever 48-1 is in the center position shown in solid outline in FIG. 3, the switch SW1 is in the first position mentioned; when the toggle lever 48-1 is in the position shown by the dashed outline shown as 48-2, the switch SW1 is in the second position mentioned; and when the toggle lever 48-1 is in the position shown by the dashed outline 48-3, the switch SW1 is in the third position mentioned.

The switch SW1 is utilized to operate the device 12 in any one of three modes of operation. When the switch SW1 is in the first position mentioned, the device 12 operates in a first mode in which the device 12 is used to monitor the transmission of data by the branch processor 14 and by the group of secondary terminals 16, 18, 20 and 22. When the switch SW1 is in the second position, the device 12 operates in a second mode in which the device is used to provide turn-around testing for the branch processor 14 and the secondary terminals, like 16, for example. And when the switch SW1 is in the third position, the device 12 operates in a third mode in which the device is used to provide turn-around and load testing for the branch processor 14 and the secondary terminals, like 16, for example.

Figure 4:
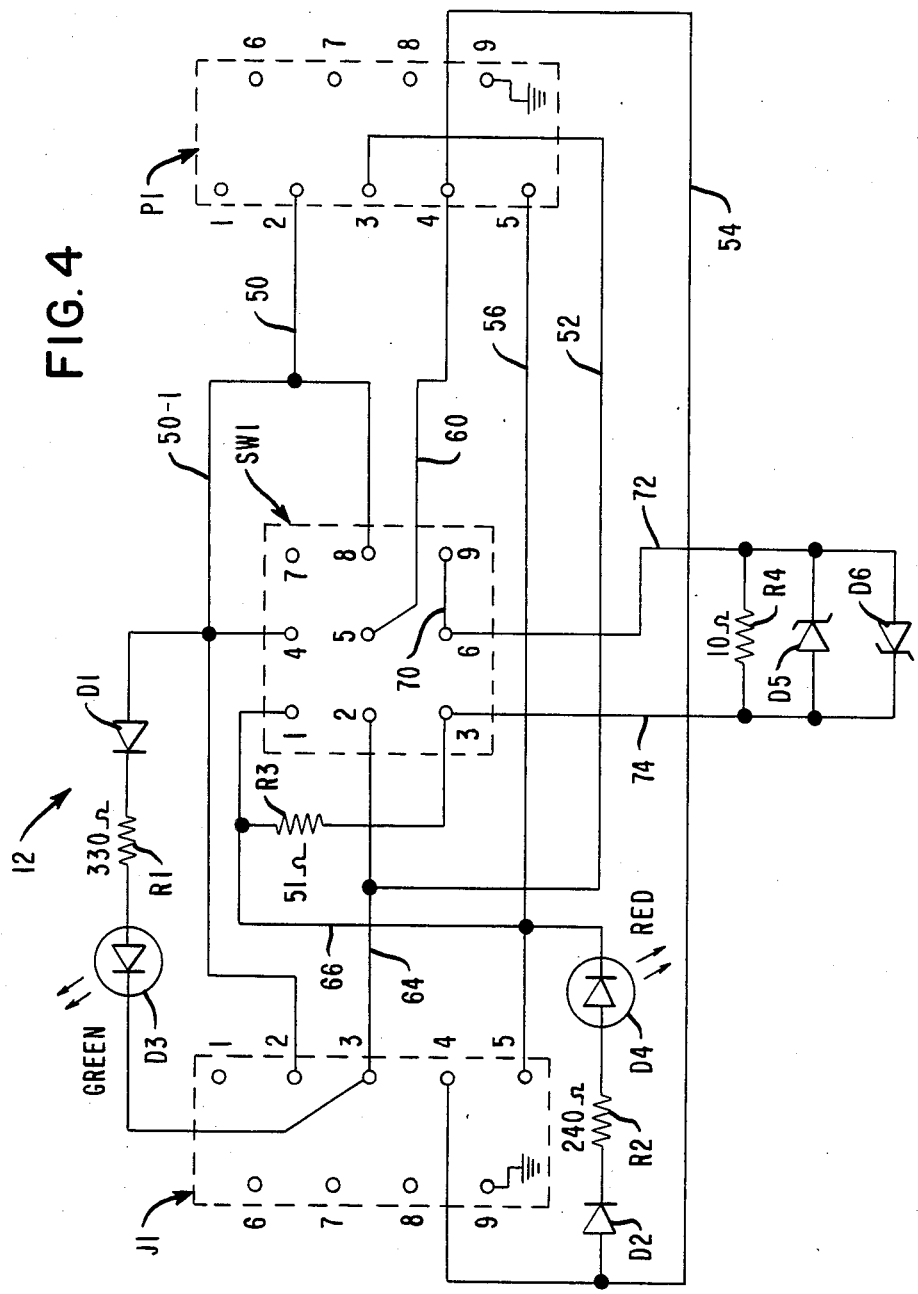
FIG. 4 is a schematic diagram of the portable testing device.
Figures 1, 5:
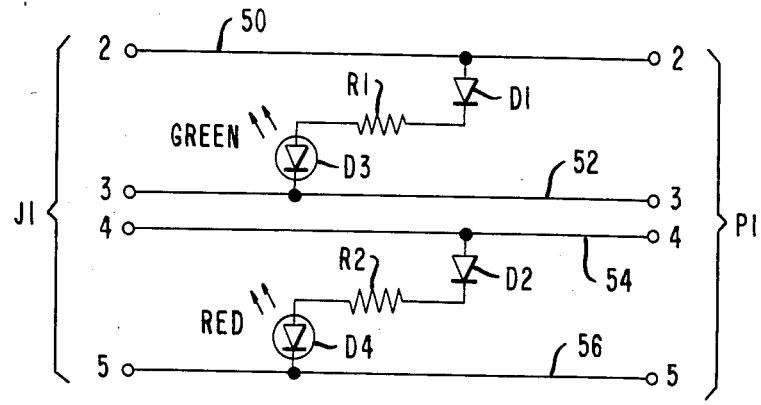
Figures 2, 5:
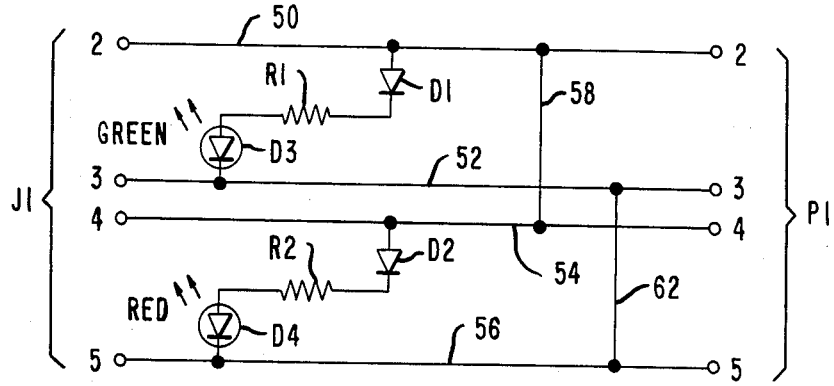
Figures 3, 5:
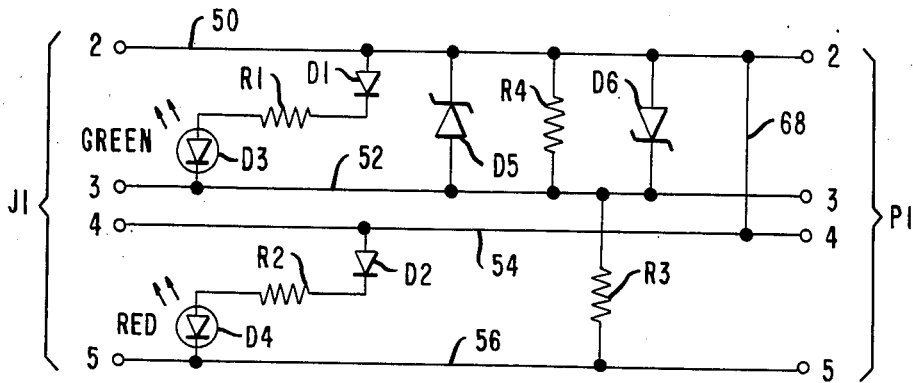

Before discussing the various modes of operation of the device 12, it would appear beneficial to discuss, first, how the device 12 is constructed. In this regard, FIG. 4 shows the complete schematic diagram of the device 12 when the switch SW1 is in the first position. FIG. 5-1 represents the equivalent circuit of the device 12 when switch SW1 is in the first position. FIG. 5-2 shows the equivalent circuit of the device 12 when the switch SW1 is in the second position, and FIG. 5-3 shows the equivalent circuit of the device 12 when the switch SW1 is also in the third position.

With reference to FIGS. 4 and 5-1, the coupler J1 shown therein corresponds to the first coupler 30 shown in FIG. 1, and correspondingly, the coupler P1 in FIGS. 4 and 5-1 corresponds to the second coupler 32 shown in FIG. 1. Each of the couplers J1 and P1 has numbered terminal connections with the numbered connections #2, #3, #4, and #5 shown in FIG. 4 corresponding to similarly-numbered terminal connections associated with the couplers J1 and P1 shown in FIG. 5-1. In the embodiment described, the conductors connected to the terminal connections #2 and #3 in the couplers J1 and P1 represent the transmission line pair in the communication line 24, and the terminal connections #4 and #5 in the couplers J1 and P1 represent the receive line pair. While the secondary terminals transmit to the branch processor 14 over the conductors associated with terminal connections #4 and #5, these connections are referenced with regard to the branch processor 14 and are consequently referred to as the "receive" line pair. A reference or ground conductor which extends along the length of the communication line 24 and which is in contact with "shielding foil" along the length of the line 24 is connected to terminal connection #9 (FIG. 4) of the couplers P1 and J1.

When the testing device 12 is to be operated in the first mode or the monitor mode, the second coupler P1 of the device is inserted into one of the first couplers 30 located in one of the junction boxes 26 anywhere in the system 10 shown in FIG. 1. In the embodiment described, when the branch processor 14 transmits, the signal level on the conductor of the transmit line pair which is connected to terminal connection #2 of the second coupler P1 goes to a high level relative to the remaining conductor of the transmit line pair which is connected to terminal connection #3 of the second coupler P1. A high level signal on terminal connection #2 of coupler P1 (FIG. 4) passes over conductors 50 and 50-1 to forward bias diode D1 causing current to flow through resistor R1 and LED D3 causing it to give a visual indication by a green light, indicating that the branch processor 14 is transmitting. The cathode of the LED D3 is connected to terminal connection #3 of the first coupler J1. Notice also that conductor 52 is connected from the terminal connection #3 of the second coupler P1 to the terminal connection #3 of the first coupler J1. Notice also that conductors 50 and 50-1 provide a "pass through" between the terminal connections #2 of the couplers P1 and J1, and similarly, conductor 52 provides a "pass through" between the terminal connections #3 of couplers P1 and J1. In this mode, if the green LED D3 does not light up, it means the branch processor 14 is not transmitting.

When one of the secondary terminals 16, 18, 20, or 22 begins to transmit, a high-level signal will appear on the terminal connection #4. Terminal connections #4 and #5 of couplers P1 and J1 form the connection to the "receive line pair" of the communication line 24 alluded to earlier herein. A high-level signal on terminal connection #4 of coupler P1 passes over conductor 54 to forward bias diode D2, causing current to pass through resistor R2, and also causing LED D4 to conduct and emit a red light. This indicates that at least one of the secondary terminals, like 22 for example, is transmitting. The cathode of the LED D4 is connected to the conductor 56 which in turn is connected between the terminal connections #5 of the couplers P1 and J1. The first circuit just described, shown functionally in FIG. 5-1, provides the monitoring function mentioned. Notice also that there is a "pass through" function obtained by the device 12. This is important because it enables the device to be coupled "in series" with one of the terminals in the event that no first coupler 30 (FIG. 1) is available to receive the coupler P1 of the device 12. For example, the second coupler 32 (FIG. 1) associated with the terminal 22 can be removed from the first coupler 30. Thereafter, the second coupler P1 of the device 12 can be inserted into the first coupler 30, and the second coupler 32 of the terminal 22 can be inserted into the first coupler J1 of the device 12. As clearly seen from FIG. 5-1, the signals on the communication line 24 will "pass through" the device 12 while these signals are monitored by the device 12.

FIG. 5-2 shows, functionally, a second circuit which is switched in by the switch SW1 when the second mode of operation is selected; this second mode performs the "turn around" function mentioned. Certain terminals, like the branch processor 14, for example, have diagnostic routines associated with them. In the simplest state, the turn-around mode performs the function of receiving data from a terminal over the transmit line pair and returning this data back to the same terminal over the receive line pair in the communication line 24. When the switch SW1 is in the second position for the second mode of operation, conductors (not shown) connect terminals #1 and #2 (FIG. 4) of switch SW1, connect terminals #4 and #5 of this switch, and also connect terminals #7 and #8 of this switch. Switch SW1 is essentially a triple-pole, double-throw switch. Conductor 58 (FIG. 5-2) which connects terminal connection #2 of the coupler J1 with terminal connection #4 of the same coupler is comprised of the conductors 50-1, the conductor (not shown) between terminals #4 and #5 (FIG. 4) of switch SW1, conductor 60 and conductor 54. Similarly, the conductor 62 (FIG. 5-2) is comprised of the conductor 64 (FIG. 4), the conductor (not shown) between the terminals #2 and #1 of switch SW1, conductor 66 and conductor 56. When the device 12 is in the second or turn-around mode of operation, both the green LED D3 and the red LED D4 are "on" indicating transmission on both the transmit line pair and the receive line pair of the communication line 24.

FIG. 5-3 shows, functionally, a third circuit which is switched in by the switch SW1 when the third mode of operation is selected; this third mode performs the turn-around function with a "circuit load." Because the communication line 24 may be up to 9000 feet in length in the system 10, it is necessary to check the branch processor 14 and the secondary terminals to make sure that the signals coming from them are of sufficient strength to enable the system 10 to function properly. The 9000 feet of communication line in the example being described is approximated by placing an equivalent load in the associated circuit. As shown in FIG. 5-3, this equivalent load is effected by placing a resistor R4 across the conductors 50 and 52 on the transmit line pair of the cable 24, and similarly, a resistor R3 is placed across the conductors 52 and 56. Also, the voltage swing during transmission is limited in one direction by a Zener diode D6 and the voltage swing is limited in the opposite direction by a Zener diode D5. In the embodiment described, the voltage swing is kept at up to approximately 5 volts, although it would be different for different systems. The conductor 68 (FIG. 5-3) performs the turn-around function in conjunction with resistor R3. Resistor R3 also places a load in the circuit along with resistor R4. When the switch SW1 is placed in the third position, a conductor (not shown) connects terminals #2 and #3 (FIG. 4) of the switch SW1 together, a conductor (not shown) connects terminals #5 and #6 together, and a conductor (not shown) connects terminals #8 and #9 of this switch together. Conductor 68 (FIG. 5-3) represents conductor 50-1 from terminal connection #2 of coupler J1, conductor 50 (FIG. 4), the conductor (not shown) between terminals #8 and #9 of switch SW1, the conductor 70 between terminals #9 and #6 of switch SW1, the conductor (not shown) between terminals #6 and #5 of this switch, and the conductor 60 (FIG. 4) which leads to terminal connection #4 of coupler P1. The conductor 72 (FIG. 4) is effectively coupled to terminal connection #2 of the first coupler J1 and the conductor 74 is effectively coupled to terminal connection #3 of coupler J1 when the switch SW1 is switched to the third position for the third mode of operation being discussed. The resistor R4 and the Zener diodes D5 and D6 are connected across the conductors 72 and 74 as shown. When the device 12 is operated in the third mode, the green LED D3 and the red LED D4 will glow to indicate activity on both the transmit line pair and the receive line pair, respectively; however, the glow of these diodes LED D3 and LED D4 will be dimmer than that during the turn-around operation in the second mode of operation due to the loads introduced into the communication line 24 during the third mode of operation. There is no change in the wiring of diode D1, resistor R1, and LED D3 and no change in the wiring of diode D2, resistor R2 and LED D4 during the first, second and third modes of operation as seen in FIGS. 5-2, 5-2, and 5-3.

What is claimed is:

1. In a system having a host terminal, a plurality of secondary terminals, and a communication line interconnecting said host and secondary terminals, said communication line having a transmit line pair, a receive line pair, a reference line, and a plurality of first couplers positioned along the length of said communication line; said host terminal and each said secondary terminal having a second coupler associated therewith for coupling to said communication line via said first couplers, the improvement comprising:
   a portable testing device, hereinafter called device, for monitoring transmission of data by said host and secondary terminals, for performing turn-around testing of said host and secondary terminals, and for performing turn-around and load testing of said host and secondary terminals, said device comprising:
   a frame;
   a said first coupler, a said second coupler, first and second visual indicators, and a switch all mounted on said frame; said switch having first, second and third selectable positions;
   first circuit means for coupling said second coupler of said device and to said first and second indicators when said second coupler of said device is coupled to one of said first couplers on said communication line and when said switch is in said first position to enable said first indicator to become active when said host terminal is transmitting over said transmit line pair and also to enable said second indicator to become active when at least one of said secondary terminals is transmitting over said receive line pair;
   second circuit means for coupling said first coupler of said device with the second coupler from said host terminal or one of said secondary terminals to perform said turn-around testing of the associated said host terminal or the associated said secondary terminal by coupling said transmit line pair to said receive line pair when said switch is in said second position; and third circuit means including a load for coupling said first coupler of said device with said second coupler from said host terminal or one of said secondary terminals to perform said turn-around and load testing of the associated said host terminal or the associated said secondary terminal by coupling said transmit line pair to said receive line pair through said load when said switch is in said third position.

2. The improvement as claimed in claim 1 in which said first, second and third circuit means include conductors which form a through connection with regard to said communication line between the first and second couplers on said device.

3. The improvement as claimed in claim 2 in which said second coupler on said device includes first and second connections to receive said transmit line pair of said communication line, and in which said first indicator is a first light-emitting diode;

said first circuit means also including a first diode and a resistor; said first diode, said resistor and said first light-emitting diode, being series connected between said first and second connections of said second coupler on said device.

4. The improvement as claimed in claim 3 in which said second coupler on said device includes third and fourth connections to receive said transmit line pair of said communication line, and in which said second indicator is a second light-emitting diode;

said first circuit means also including a second diode and a second resistor; said second diode, said second resistor, and said second light-emitting diode being series-connected between said third and fourth connections of said second coupler on said device.

5. The improvement as claimed in claim 4 in which said load of said third circuit means includes:

a first load resistor connected across said first and second connections of said second coupler on said device; and a second load resistor connected across said second and fourth connections of said second coupler on said device;

said third circuit means also including:

a conductor connected across said first and third connections of said second coupler on said device; and first and second Zener diodes connected in opposed relation across said first and second connections of said second coupler on said device.

* * * * *